US008798672B2

(12) United States Patent
Lim et al.

(10) Patent No.: US 8,798,672 B2
(45) Date of Patent: Aug. 5, 2014

(54) METHOD OF PROCESSING A CALL IN A MOBILE TERMINAL

(75) Inventors: Guk-Chan Lim, Seoul (KR); Yoo-Seung Yang, Seoul (KR); Joo-Yong Lee, Gyeonggi-Do (KR); Dong-Chul Jin, Gyeonggi-Do (KR); Hung-Chol Chin, Seoul (KR); Sang-Mo Park, Seoul (KR); Hyun-Jung Park, Gyeonggi-Do (KR); Hyun-Jun Kim, Seoul (KR); Haeng-Chul Kwak, Gyeonggi-Do (KR); Man-Soo Sin, Seoul (KR)

(73) Assignee: LG Electronics Inc., Seoul (KR)

( * ) Notice: Subject to any disclaimer, the term of this patent is extended or adjusted under 35 U.S.C. 154(b) by 522 days.

(21) Appl. No.: 12/771,739

(22) Filed: Apr. 30, 2010

(65) Prior Publication Data

US 2011/0171995 A1 Jul. 14, 2011

(30) Foreign Application Priority Data

Jan. 13, 2010 (KR) ........................ 10-2010-0003253

(51) Int. Cl.
*H04M 1/00* (2006.01)

(52) U.S. Cl.
USPC ......... 455/552.1; 455/420; 455/574; 370/353

(58) Field of Classification Search
CPC ............................... H04W 52/00; H04W 76/00
USPC ........................ 455/420, 574, 552.1; 370/353
See application file for complete search history.

(56) References Cited

U.S. PATENT DOCUMENTS

| 7,882,217 | B2* | 2/2011 | Katzir ............................ 709/224 |
| 8,102,841 | B2* | 1/2012 | Elumalai et al. .............. 370/353 |
| 2008/0162914 | A1 | 7/2008 | Adrangi et al. |
| 2008/0244289 | A1* | 10/2008 | LeProwse et al. ............ 713/320 |
| 2009/0063845 | A1* | 3/2009 | Lin ................................ 713/100 |
| 2011/0307727 | A1* | 12/2011 | Wu ................................ 713/323 |

FOREIGN PATENT DOCUMENTS

WO WO 2010094182 A1 * 8/2010

* cited by examiner

*Primary Examiner* — Amancio Gonzalez
(74) *Attorney, Agent, or Firm* — Birch, Stewart, Kolasch & Birch, LLP

(57) ABSTRACT

A method of controlling a mobile terminal, and which includes controlling, via a Windows processor, a plurality of peripheral devices of the mobile terminal; switching, via the Windows processor, the mobile terminal into a sleep state; granting, via an arbiter control processor, a control authority for controlling predetermined peripheral devices among the plurality of peripheral device to a 3G modem when the mobile terminal is switched into the sleep state; receiving, via a communication unit on the mobile terminal, an incoming call; and managing, via the 3G modem, circuit data and the predetermined peripheral devices for the incoming call.

16 Claims, 7 Drawing Sheets

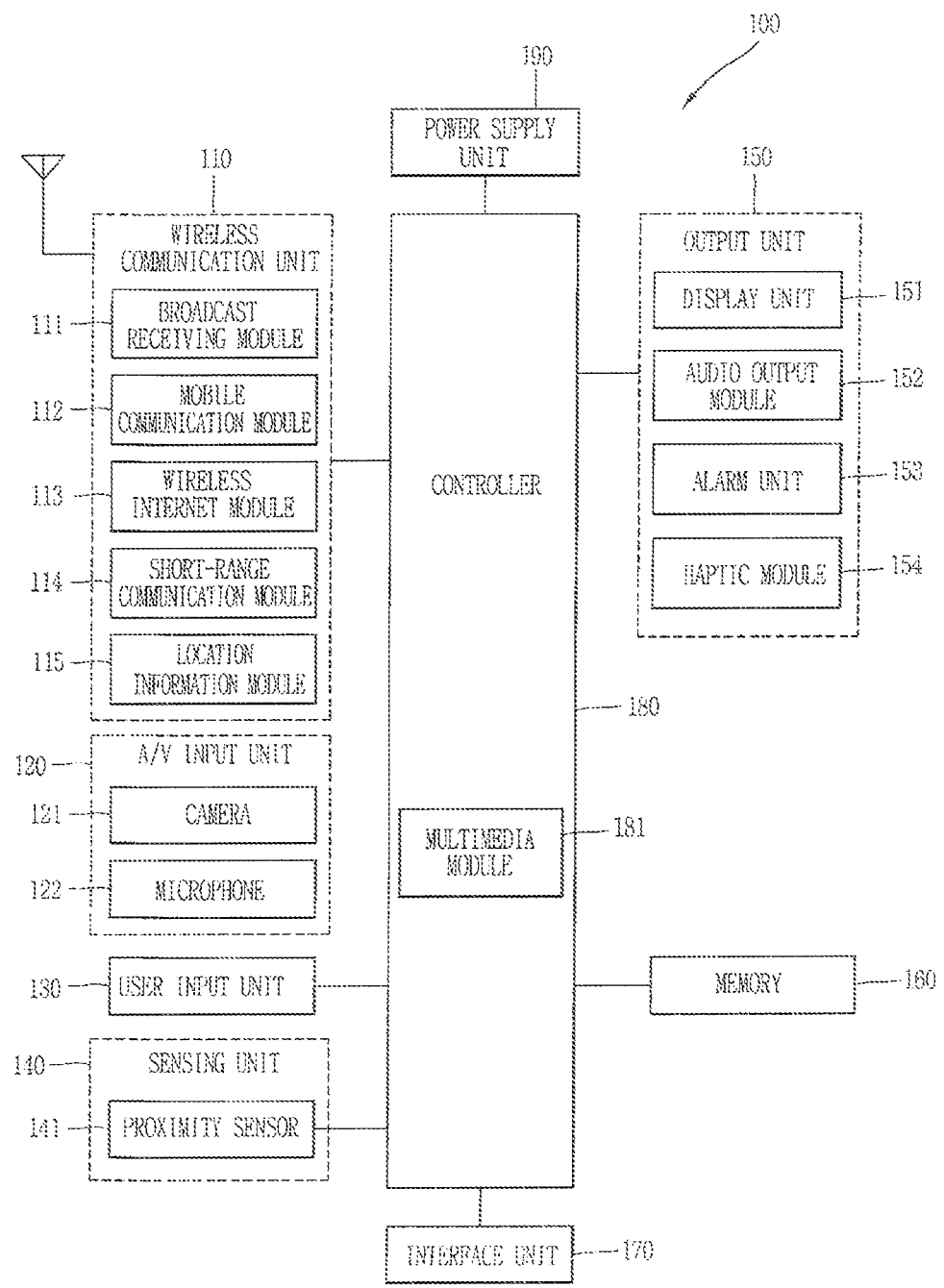

METHOD OF PROCESSING A CALL IN A MOBILE TERMINAL

CROSS-REFERENCE TO A RELATED APPLICATION

Pursuant to 35 U.S.C. §119(a), this application claims the benefit of Korean Application No. 10-2010-0003253, filed on Jan. 13, 2010, the contents of which is hereby incorporated by reference herein in its entirety.

BACKGROUND OF THE INVENTION

1. Field of the Invention

The present invention relates to a mobile terminal, and more particularly, to a mobile terminal operated under a Windows operating system.

2. Description of the Related Art

A mobile terminal is a portable device including at least one of a voice and video call function, an information input and output function, a data store function, and the like while being carried by the user.

As it becomes multifunctional, furthermore, such a terminal is allowed to capture still images or moving images, play music or video files, play games, receive broadcast and the like, so as to be implemented as an integrated multimedia player.

In order to implement a complicated function of the multimedia player, various attempts have been newly made in the aspect of hardware and software.

Terminal manufacturers have developed a mobile terminal to which Windows-based operating system (OS), such as Windows Mobile allowing the user to easily and conveniently manipulate and select a menu, is applied. However, the mobile terminal to which Window Mobile is applied can provide a user-friendly UI environment, but its application uses are still limited and thus it cannot be fully compatible with a personal computer.

In order to solve the forgoing problem, there has been considered a method of applying a typical Windows OS to the mobile terminal, but it is impossible as of the present time for the Windows OS mounted in a personal computer to process 3rd generation circuit data of the mobile communication in real-time.

As an operating system in which 3G circuit data is not taken into consideration, Windows OS has an advantage capable of providing an abundance of applications, but also has a problem incapable of offering a circuit data service because of a wake-up latency due to power management.

An important aspect of the present invention is that the present inventors recognized certain drawbacks of the related art, as mentioned above. As a result, the present inventors provided a solution to such drawbacks, as follows.

An object of the present invention is to provide a terminal performing a voice call (circuit data) service in a personal computer-based operating system environment.

In order to accomplish the foregoing object, a mobile terminal according to the present invention may include a plurality of peripheral devices constituting a terminal, a first processing unit configured to manage the peripheral devices under the control of Windows, a second processing unit configured to manage some of the peripheral devices under the control of a 3G modem, and an arbitration device configured to grant a control authority for some peripheral devices used in a voice call service to the second processing unit if the Windows is switched to a sleep state.

In order to accomplish the foregoing object, a method of processing a call in a mobile terminal may include controlling various peripheral devices in a terminal according to the control of Windows, granting a control authority for predetermined peripheral devices to a 3G modem if the Windows is switched to a sleep state, and managing circuit data and the predetermined peripheral devices according to the control of the 3G modem if a voice call service is started. It is characterized in that the Windows is a personal computer-based operating system.

Additional features and advantages of the present invention will be disclosed in the following description, and partially they will be apparent from the description or understood through the execution of the present invention. The objective of the present invention and other advantages thereof will be implemented by a structure set forth in the following written description and the accompanying drawings as well as the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal associated with an embodiment of the present invention;

DETAILED DESCRIPTION OF THE INVENTION

Figure 2A:
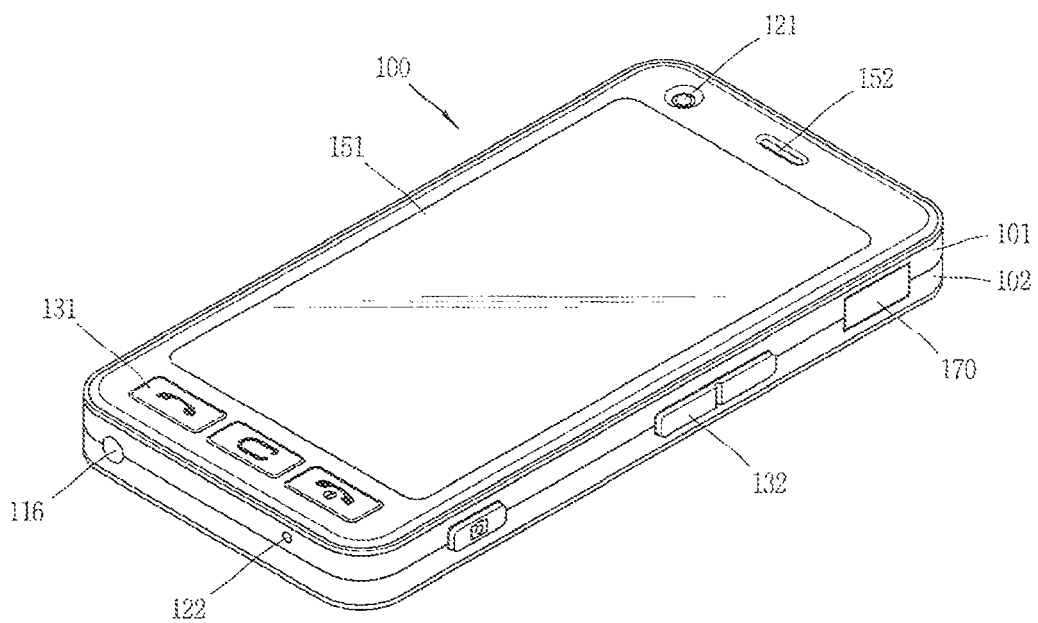
FIG. 2a is a front perspective view illustrating a portable terminal associated with an embodiment of the present invention.

Hereinafter, the configuration of a mobile terminal according to a preferred embodiment of the present invention will be described with reference to the accompanying drawings. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used each other.

FIG. 1 is a block diagram illustrating a mobile terminal associated with an embodiment of the present invention.

A terminal may be implemented in various forms. For example, a terminal disclosed herein may include a mobile terminal such as a portable phone, a smart phone, a notebook computer, a digital broadcast terminal, a personal digital assistant (PDA), a portable multimedia player (PMP), a navigation, and the like as well as a stationary terminal such as digital TV, desktop computer, and the like. In the following description, it will be described by assuming that the terminal is a mobile terminal. However, it would be easily understood by those skilled in the art that a configuration according to the embodiments disclosed herein may be applicable to the stationary terminal such as digital TV, desktop computer, and the like if constituent elements particularly configured for the mobile terminal are excluded.

Referring to FIG. 1, hereinafter, a mobile terminal of the present invention will be described in functional aspects.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like.

FIG. 1 illustrates a mobile terminal having various constituent elements. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is combined with the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like. In particular, when an inter-layer structure is formed with the touch pad and a display unit 151 which will be described later, it may be called a touch screen.

The sensing unit 140 detects a current status of the mobile terminal 100 such as an opened or closed state of the mobile terminal 100, a location of the mobile terminal 100, an orientation of the mobile terminal 100, an acceleration and deceleration of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include an acceleration sensor (not shown) and a proximity sensor 141, and the proximity sensor 141 will be described later in association with the touch screen.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Here, the identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Furthermore, the interface unit may 170 serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal has accurately been mounted to the cradle.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Furthermore, the display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As described above, internal constituent elements of a mobile terminal associated with the present invention have been described from a functional viewpoint. Next, referring to FIGS. 2 and 3, external constituent elements of a mobile terminal associated with the present invention will be described from a functional viewpoint. Hereinafter, for the sake of convenience of explanation, a bar type mobile terminal will be described as an example, among various types of mobile terminals such as folder type, bar type, swing type, slider type, and the like. However, it does not mean that the present invention is limited to a bar type mobile terminal, but may be applicable to all types of mobile terminals.

FIG. 2a is a front perspective view illustrating an example of a mobile terminal or portable terminal associated with the present invention.

The portable terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. Various electronic components are built in a space formed between the front case 101 and the rear case 102. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may be used to receive a command, such as start, end, scroll, 3D browser execution, or the like, and the second manipulation unit 132 may be used to receive a command, such as controlling a volume level being outputted from the audio output unit 152, or switching it into a touch recognition mode of the display unit 151.

Figure 2B:
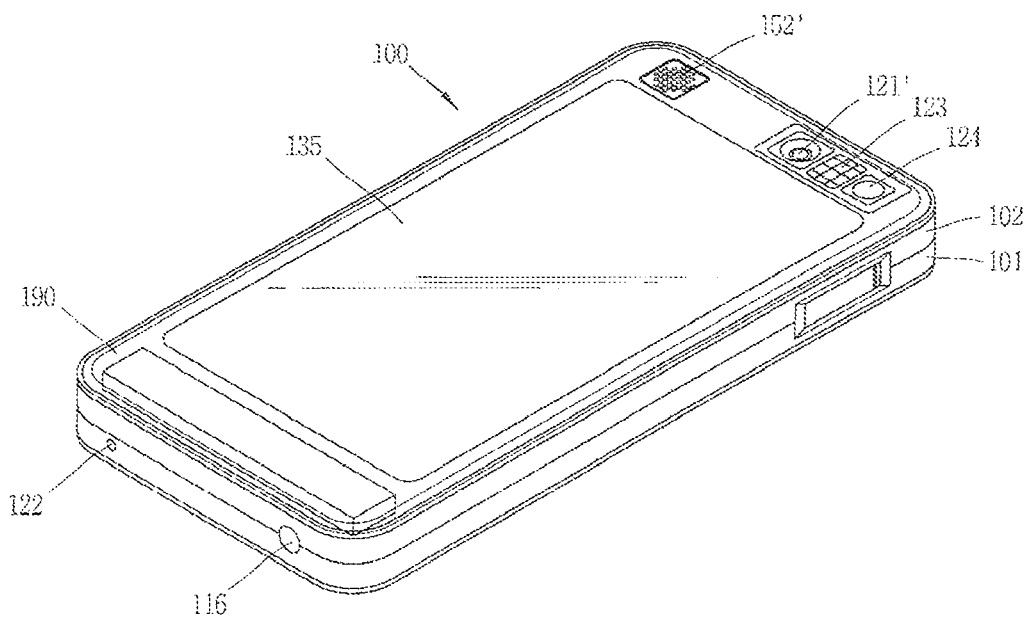
FIG. 2b is a rear perspective view illustrating a portable terminal associated with an embodiment of the present invention.

FIG. 2*b* is a rear perspective view illustrating a portable terminal of FIG. 2*a*.

Referring to FIG. 2*b*, a camera 121' may be additionally mounted on a rear surface of the terminal body, namely, the rear case 102. The camera 121' has an image capturing direction, which is substantially opposite to the direction of the camera 121 (refer to FIG. 2*a*), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately. The cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2*a*) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Hereinafter, a preferred embodiment of the present invention will be described below with reference to the accompanying drawings.

In general, an operating system (for example, Windows OS, etc.) has an advanced configuration program interface (ACPI) for power control. The ACPI defines a power management status ranging from S0 to S5 to minimize power consumption at each step. When the power management status is above S3, Windows OS enters into a sleep mode.

If Windows is in the step of S3 state, then the terminal turns off the power of the central processing unit (CPU) and suspends the on-going job in a memory. In other words, the mobile terminal mounted with a typical Windows OS can reduce power consumption, but it may consume several tens of seconds for wake-up time, and thus it may not be suitable for a 3G circuit data service.

Accordingly, when a mobile terminal is mounted with a typical Windows OS, it may be necessarily required to have a singular device in which a 3G circuit data can be processed.

According to an aspect of the present invention, a mobile terminal is provided with a micro processor unit (MPU) implementing Windows OS and a 3G modem MPU, respectively, to manage a control authority of those MPUs.

First, when Windows OS is mounted on a typical mobile terminal, an apparatus configuration of the mobile terminal and its control relation will be described below.

Figure 3:
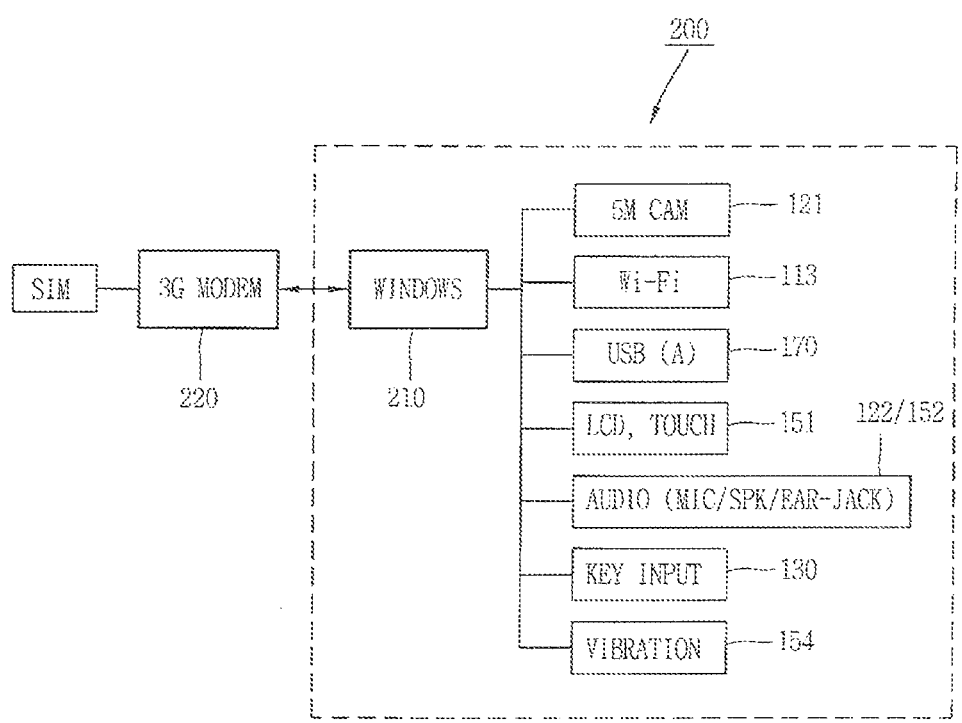
FIG. 3 is a block diagram illustrating an apparatus configuration of a typical terminal mounted with Windows OS.

FIG. 3 illustrates an apparatus configuration of a typical terminal mounted with Windows OS, which is an exemplary view illustrating a control relation between an MPU for implementing Windows OS (hereinafter, "Windows MPU") and a 3G modem MPU.

The exemplary view is a block diagram in which a typical terminal (for example, notebook, desktop, etc.) mounted with Windows OS processes packet data using a 3G modem. A device such as a dongle may be an example of the 3G modem MPU 220. The dongle is a small-sized hardware connected to a computer, which can be carried by the user as a USB flash drive. In the early days, it has been used for the purpose of computer software authentication but in recent years the word "dongle" is widely used as a word indicating a broadband wireless adaptor.

A Windows MPU 210 according to this embodiment controls all peripheral devices and receives only data packet (for data communication) from the 3G modem MPU 220. FIG. 3 illustrates a structure in which data communication services are only possible due to the wake-up latency of Windows OS.

In case of a data communication service (for example, packet data), there is no restriction in the service provision even if there is an effect of delay time, but receiving and originating call services should be made available within at least 0.5 second to provide the services in case of a voice call service (for example, circuit data).

In other words, data is not required to be processed in real-time in case of a data communication service, but data in real-time processing should be secured in case of a voice call service. For example, in case of an incoming voice call, a Windows MPU 210 in a state that the power management status of ACPI is above S3 takes more than several tens of seconds to wake up. In this manner, the wake-up latency of Windows OS, which takes several tens of seconds, will be a great obstacle in offering voice call services. The 3G modem MPU 220 cannot perform processes for a voice call until the Windows MPU 210 for controlling various peripheral devices, such as camera module 121, Wi-Fi 113, USB 170, display unit 151, audio input/output units 120, 152, key input unit 130, and haptic module 154, in a terminal, wakes up.

As illustrated in FIG. 3, in a situation that the Windows MPU 210 has a control authority of most peripheral devices, there scarcely exists a device in which the 3G modem MPU 220 controls for an incoming call. Therefore, the user cannot receive a normal voice call service.

As of the present time, it is not easy to expect the development of an integrated MPU (Windows MPU+3G modem MPU) or integrated software (OS) through a mutual cooperation with communication modem manufacturers and Windows manufacturers (for example, Microsoft Corporation, etc.) As a result, a terminal according to the present invention will be directed toward an intermediate form (transient form).

Figure 4:
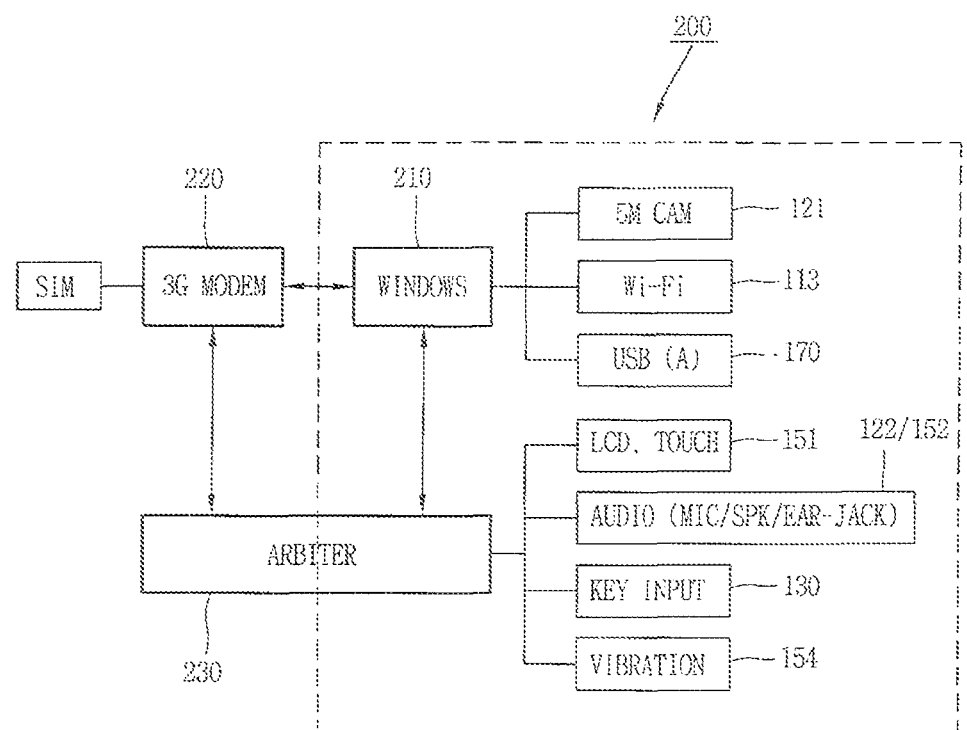
FIG. 4 is a block diagram illustrating an apparatus configuration of a terminal and its control relation according to the present invention.

FIG. 4 is a view in which a block diagram as illustrated in FIG. 1 is reconfigured to help the understanding of the present invention, which illustrates an apparatus configuration of a terminal and its control relation according to the present invention.

A terminal according to the present invention may be a typical personal computer mounted with Windows OS, such as a notebook, a desktop, and the like, or may be a mobile communication terminal including a 3G modem.

As illustrated in FIG. 4, a terminal according to the present invention may have an arbiter 230 capable of arbitrating a control authority between the Windows MPU 210 and the 3G modem MPU 220, thereby allowing the arbiter 230 to grant the control authority for peripheral devices used in a voice call service to the two devices 210, 220 selectively.

When Windows OS enters into a sleep mode, the arbiter 230 detects a state of the Windows OS and temporarily grants the control authority of the peripheral devices required for a voice call processing to the 3G modem MPU 220. For example, the control authority for predetermined output devices (for example, speaker 152, haptic module 154, etc.) for alerting and the control authority of a touch screen and the like, are granted to the 3G modem MPU 220. In addition, the control authority of display unit 151, audio input unit 122, key input unit 130 and the like, may be granted to the 3G modem MPU 220.

In case of a video communication service, the control authority of the camera module 121 may be also granted to the 3G modem MPU 220. The user according to the present invention may set peripheral devices used for the voice call service through an environment setting menu of the terminal at his or her discretion.

Subsequently, if a call reception or transmission is made, then the 3G modem MPU 220 will control peripheral devices for which the control authority is granted while processing circuit data in real-time.

According to the present invention, the Windows MPU 210 and the 3G modem MPU 220 have a separate pin (for example, dedicated pin) or connection terminal for sending and/or receiving the control authority to and/or from each other.

Figure 5:
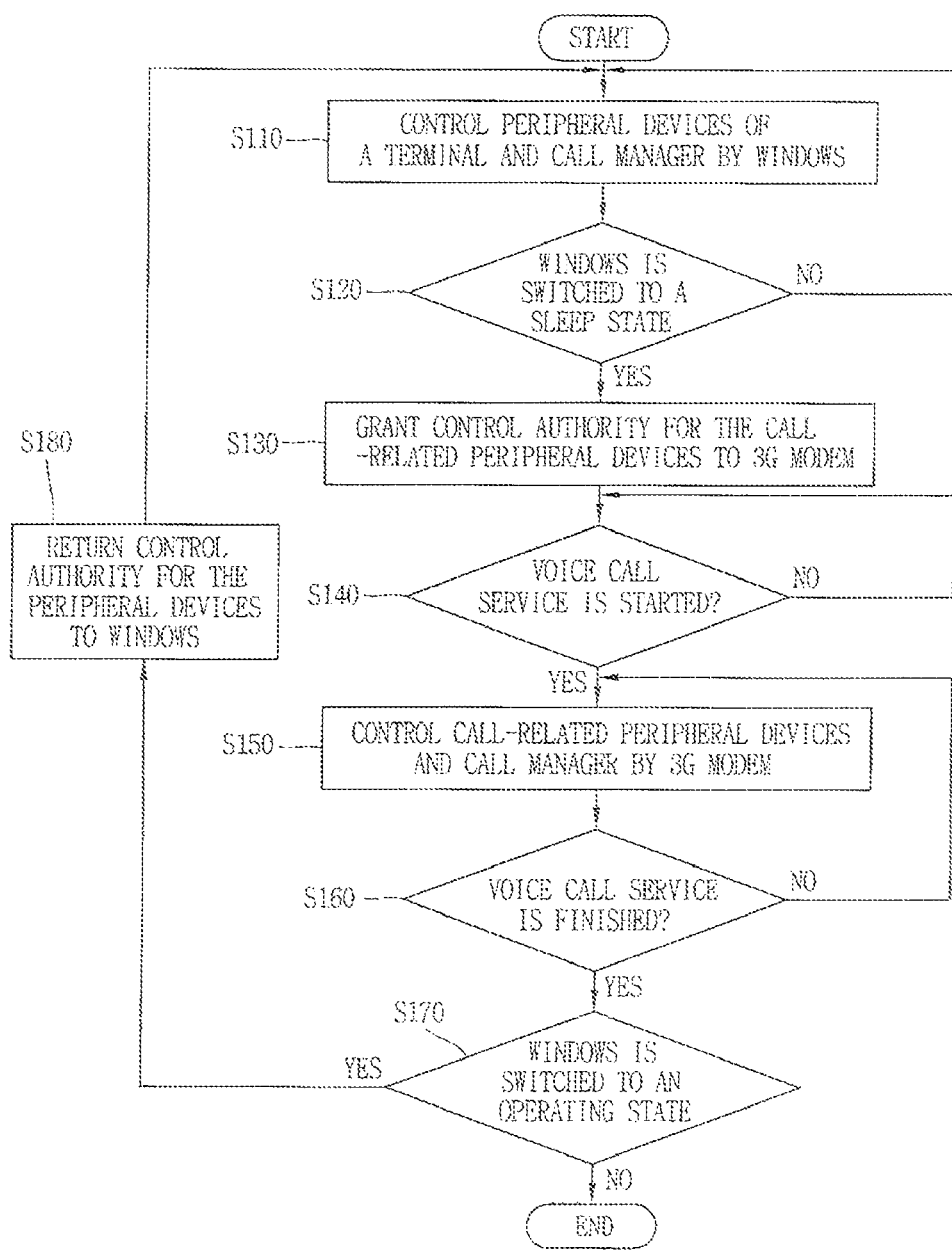
FIG. 5 is a flow chart illustrating an operation of a terminal according to the present invention.

FIG. 5 is a flow chart illustrating the operation of a terminal according to the present invention.

In the operating state, the Windows OS controls peripheral devices constituting a terminal and performs a connection management application (CM App) to process a voice call service (S110).

However, when Windows OS enters into a sleep mode (S120), the arbiter 230 detects the status and initializes peripheral device required for a voice call processing. Then, the arbiter 230 temporarily grants the control authority of those peripheral devices and the CM App to the 3G modem MPU 220 (S130).

In case of the display unit 151, among the peripheral devices, the resolution set by the Windows MPU 210 may not be supported in the 3G modem MPU 220. At this time, the arbiter 230 converts the resolution of the display unit 151 to the resolution that can be supported by the 3G modem MPU 220 during the process of initializing the peripheral devices.

Subsequently, if a call service is started by a call reception (S140), then the 3G modem MPU 220 manages the peripheral devices to which the control authority is granted and processes circuit data in real-time (S150). The 3G modem MPU 220 implements the CM App to provide a call service.

The, if the call is completed (S160), then the arbiter 230 checks whether or not the sleep mode of the Windows OS is released (S170). If the sleep mode of the Windows OS is released, then the arbiter 230 returns the control authority that has been granted to the 3G modem MPU 220 to the Windows MPU 210 (S180).

When power is applied to a terminal that has been powered off, the arbiter 230 according to the present invention temporarily grants a control authority of the peripheral devices required for a voice call processing and the CM App to the 3G modem MPU 220 having a relatively fast booting speed. Then, the 3G modem MPU 220 is booted at a fast speed, thereby initializing peripheral devices to which the control authority has been granted. Then, the 3G modem MPU 220 executes the CM App until the Windows OS is normalized to correspond to a call reception or transmission.

Subsequently, if Windows OS is booted up and normalized, then the arbiter 230 returns the control authority that has been granted to the 3G modem MPU 220 to the Windows MPU 210 again to process a voice call service under the control of Windows OS.

Figure 6A:
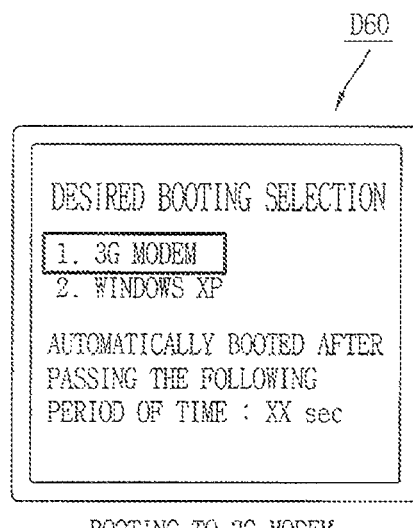
FIGS. 6a and 6b are an exemplary view illustrating a booting screen of a terminal according to an embodiment of the present invention.
Figure 6B:
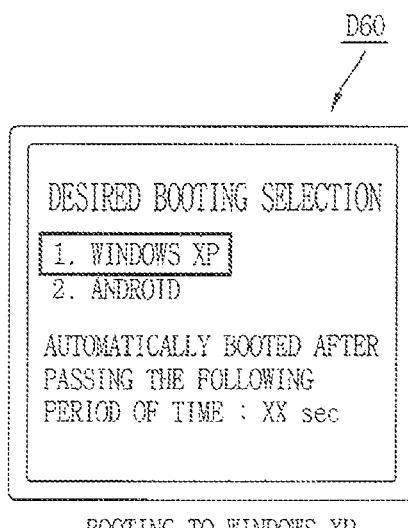

FIG. 6 is an exemplary view illustrating a booting screen of a terminal according to an embodiment of the present invention.

As illustrated in FIG. 6a, when the user does not select his or her desired device until a predetermined time has passed, the arbiter 230 selects the 3G modem MPU 220 as a booting device, and temporarily grants a control authority of the peripheral devices required for a voice call processing and the CM App. The user may select the Windows MPU 210 as a booting device through a booting screen D60.

According to the present invention, an acceleration sensor may be used as a method of selecting the booting device. FIG. 7 is an exemplary view illustrating a booting method using an acceleration sensor.

Figure 7A:
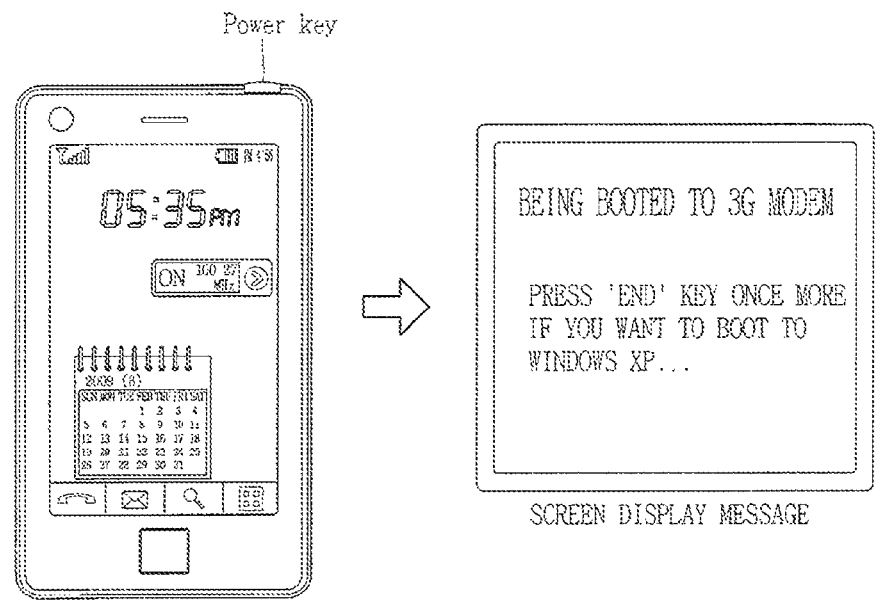
FIGS. 7a and 7b are an exemplary view illustrating a booting method using an acceleration sensor.

In a booting screen, the user may select his or her desired booting device (3G modem & Windows OS) using a method of standing up or laying down a terminal. In other words, in case of booting with a 3G modem, the user stands up a terminal while an initial booting screen is displayed as illustrated in FIG. 7a.

Figure 7B:
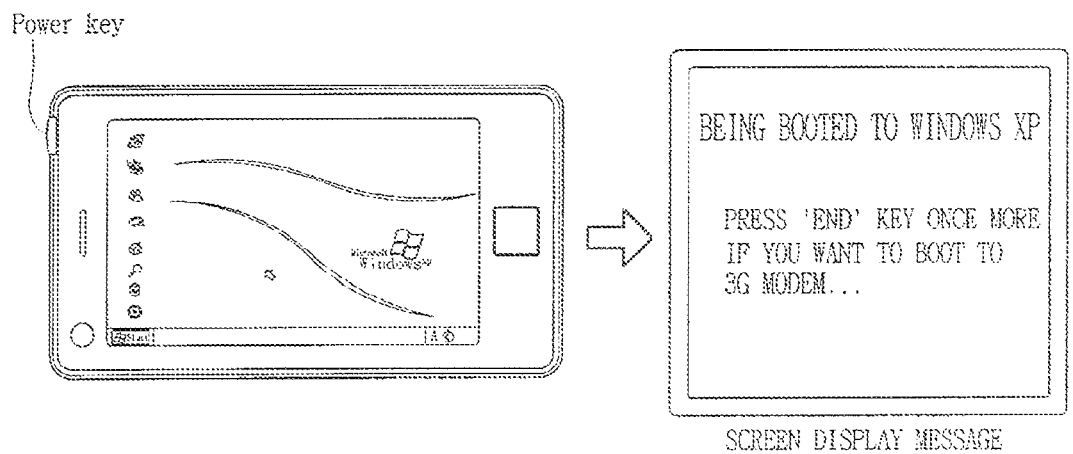

Then, in case of booting with Windows OS, the user lays down a terminal while an initial booting screen is displayed as illustrated in FIG. 7b. The arbiter 230 (or booting system) detects whether the terminal is in a stand-up or laid-down state through an acceleration sensor to select the booting device of the terminal.

As described above, the arbiter 230 according to the present invention can be implemented in a program-recorded medium as a computer-readable code. Furthermore, the computer-readable code may include all kinds of recording devices to be stored with data that can be read by a computer system.

As an example of the computer-readable medium, there are ROM, RAM, CD-ROM, magnetic tape, floppy disk, optical data storage device, and the like, and it may be also implemented in a carrier wave form (for example, transmission through the Internet). The computer may include the controller 180 of a mobile terminal.

As described above, according to the present invention, an arbitrating device (arbiter 230) is separately provided to manage a control authority between the Windows MPU 210 and the 3G modem MPU 220, thereby allowing the arbitrating device to grant a control authority for peripheral devices used in a voice call service to the two devices 210, 220 selectively.

Through the arbitrating device, the present invention has solved a problem of wake-up latency of Windows OS in which it consumes more than several tens of seconds to wake up, and has proposed a method capable of allowing a mobile terminal or personal computer mounted with a typical Windows OS to provide a phone call service.

The present invention has been described with reference to preferred embodiments illustrated in the accompanying drawings. However, it may be apparent to those skilled in the art that those preferred embodiments are only illustrative, and all or part of the described embodiment(s) may be selectively combined and configured to make various modifications thereto. Consequently, the true technical protective scope of the present invention should be determined based on the technical spirit of the appended claims. cm What is claimed is:

What is claimed is:

1. A method of controlling a mobile terminal, the method comprising:
   controlling, via a Windows processor, a plurality of peripheral devices of the mobile terminal;
   temporarily granting, via an arbiter control processor, a control authority for controlling predetermined peripheral devices required for an incoming call processing among the plurality of peripheral devices to a 3G modem when the Windows processor is booted up or switched into a sleep state;
   receiving, via a communication unit on the mobile terminal, the incoming call;
   managing, via the 3G modem, circuit data and the predetermined peripheral devices for the incoming call until the Windows processor is woken up and switched into an operating state or the Windows processor is booted up and normalized; and
   automatically returning, via an arbiter control processor, the control authority that has been granted to the 3G modem to the Windows processor when the Windows processor is woken up and switched into the operating state or the Windows processor is booted up and normalized,
   wherein a wake-up time and a booting speed of the 3G modem are faster than those of the Windows processor.

2. The method of claim 1, wherein when the incoming call is a voice incoming call, the predetermined peripheral devices include at least one of an audio output unit, a key input unit, a touch screen and a vibration module.

3. The method of claim 1, wherein when the incoming call is a video incoming call, the predetermined peripheral devices include at least one of an audio output unit, a video output unit, a key input unit, a touch screen and a vibration module.

4. The method of claim 1, wherein a number of the predetermined peripheral devices is less than a number of the plurality of peripheral devices.

5. The method of claim 1, wherein the arbiter control processor includes at least one pin connected to the Windows processor and at least one pin connected to the 3G modem.

6. The method of claim 1, wherein the arbiter control processor grants exclusive control authority to the 3G modem when the mobile terminal is switched into the sleep state.

7. The method of claim 1, further comprising:
   receiving, via the 3G modem, a signal indicating the incoming call has ended;
   switching, via the Windows processor, the mobile terminal into an active state from the sleep state; and
   granting, via the arbiter control processor, the control authority for controlling all of the plurality of peripheral devices to the Windows processor when the mobile terminal is switched into the active state.

8. The method of claim 1, wherein the Windows processor is a personal computer-based operating system.

9. A mobile terminal, comprising:
   a Windows processor configured to have a control authority for controlling a plurality of peripheral devices of the mobile terminal;
   an arbiter control processor configured to detect a state of the Windows processor, and to temporarily grant the control authority for controlling the peripheral devices required for an incoming call processing among the plurality of peripheral devices to a 3G modem when the Windows processor is booted up or switched into a sleep state; and
   a communication unit configured to receive an incoming call,
   wherein the 3G modem is configured to:
   manage circuit data and the predetermined peripheral devices for the incoming call until the Windows processor is woken up and switched into an operating state or the Windows processor is booted up and normalized, and
   automatically return the temporarily granted control authority to the Windows processor when the Windows processor is woken up and switched into the operating state or the Windows processor is booted up and normalized, and
   wherein a wake-up time and a booting speed of the 3G modem are faster than those of the Windows processor.

10. The mobile terminal of claim 9, wherein when the incoming call is a voice incoming call, the predetermined peripheral devices include at least one of an audio output unit, a key input unit, a touch screen and a vibration module.

11. The mobile terminal of claim 9, wherein when the incoming call is a video incoming call, the predetermined peripheral devices include at least one of an audio output unit, a video output unit, a key input unit, a touch screen and a vibration module.

12. The mobile terminal of claim 9, wherein a number of the predetermined peripheral devices is less than a number of the plurality of peripheral devices.

13. The mobile terminal of claim 9, wherein the arbiter control processor includes at least one pin connected to the Windows processor and at least one pin connected to the 3G modem.

14. The mobile terminal of claim 9, wherein the arbiter control processor is further configured to grant exclusive control authority to the 3G modem when the mobile terminal is switched into the sleep state.

15. The mobile terminal of claim 9, wherein the 3G modem is further configured to receive a signal indicating the incoming call has ended, the Windows processor is further configured to switch the mobile terminal into an active state from the sleep state, and the arbiter control processor is further configured to grant the control authority for controlling all of the plurality of peripheral device to the Windows processor when the mobile terminal is switched into the active state.

16. The mobile terminal of claim 9, wherein the Windows processor is a personal computer-based operating system.

* * * * *